US009116587B2

(12) United States Patent
Lee et al.

(10) Patent No.: US 9,116,587 B2
(45) Date of Patent: Aug. 25, 2015

(54) TOUCH PANEL AND A MANUFACTURING METHOD THEREOF

(71) Applicants: Yuh-Wen Lee, Chubei (TW); Hsiang-Lung Hsia, Changhua (TW); Kun-Rung Lin, Zhubei (TW); Minghua Ye, Ji'an (CN); Xianbin Xu, Xiamen (CN); Tsung-Ke Chiu, Tainan (TW); Huilin Ye, Xiamen (CN); Jing Yu, Xiamen (CN)

(72) Inventors: Yuh-Wen Lee, Chubei (TW); Hsiang-Lung Hsia, Changhua (TW); Kun-Rung Lin, Zhubei (TW); Minghua Ye, Ji'an (CN); Xianbin Xu, Xiamen (CN); Tsung-Ke Chiu, Tainan (TW); Huilin Ye, Xiamen (CN); Jing Yu, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 200 days.

(21) Appl. No.: 13/726,553

(22) Filed: Dec. 25, 2012

(65) Prior Publication Data
US 2014/0176453 A1   Jun. 26, 2014

(30) Foreign Application Priority Data

Dec. 29, 2011 (CN) .......................... 2011 1 0459047

(51) Int. Cl.
*G06F 3/044* (2006.01)
(52) U.S. Cl.
CPC ...... *G06F 3/044* (2013.01); *G06F 2203/04103* (2013.01); *G06F 2203/04111* (2013.01)
(58) Field of Classification Search
CPC ....................................................... G06F 3/044
USPC ................................................. 345/173, 174
See application file for complete search history.

(56) References Cited

FOREIGN PATENT DOCUMENTS

| CN | 200920261714 U | 9/2010 |
| TW | 200936734 | 9/2009 |
| TW | M397556 | 2/2011 |

*Primary Examiner* — Evan Pert
(74) *Attorney, Agent, or Firm* — Gokalp Bayramoglu (57) ABSTRACT

The present disclosure provides a method for manufacturing a touch panel, wherein the method comprises: forming a touch sensing layer on a visible region and a non-visible region of a cover substrate, wherein the non-visible region is located at periphery of the visible region forming a first opaque insulating layer on the touch sensing layer in the non-visible region; forming a wiring layer on the first opaque insulating layer: and forming a conductive layer to electrically connect the wiring layer and the touch sensing layer. Moreover, the present disclosure also provides a touch panel. Accordingly, the touch sensing accuracy is maintained, and the production rate is improved.

18 Claims, 7 Drawing Sheets

TOUCH PANEL AND A MANUFACTURING METHOD THEREOF

BACKGROUND OF THE INVENTION

This Application claims the benefit of the People's Republic of China Application No. 201110459047.0, filed on Dec. 29, 2011.

FIELD OF THE INVENTION

The present disclosure relates to a touch technology. More particularly, the present disclosure relates to a touch panel and a manufacturing method thereof.

DESCRIPTION OF THE RELATED ART

Typically the function of a touch panel is to perform input operations using a finger or a stylus. Generally, according to different sensing methods, touch panels can be classified into resistive touch panels, capacitive touch panels, acoustic-wave touch panels and optical touch panels.

Surface area of a general touch panel can be roughly divided into two portions: a non-visible region and a visible region. Generally, the non-visible region is located at the periphery of the visible region and forms a border. In order to prevent a user from directly seeing circuits or other elements disposed correspondingly in the non-visible region while operating, a black material is usually used to shade the non-visible region. Therefore, the non-visible region seen by a user can be a black border located at the periphery of the visible region. The visible region is a portion used for touch and operation by a user.

Figure 1:
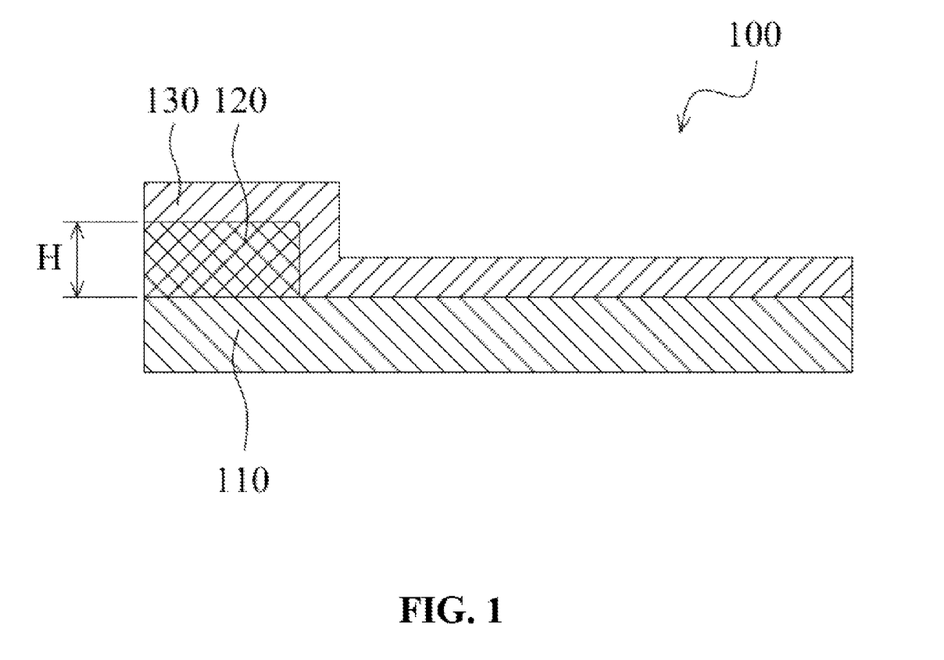
FIG. 1 is a schematic sectional view of a part of a conventional touch panel.

FIG. 1 is a schematic sectional view of a part of a conventional touch panel 100. For conciseness, only a partial set of elements of the conventional touch panel 100 is shown in FIG. 1. Referring to FIG. 1, the touch panel 100 comprises a cover substrate 110, a black insulating layer 120 disposed on a non-visible region of the cover substrate 110, and a touch sensing layer 130 disposed on a visible region of the cover substrate 110 and on the black insulating layer 120 in the non-visible region. When forming the touch sensing layer 130, a comparatively high temperature (such as 300~350° C.) is required. Thus, due to being unable to resist high temperature, the black insulating layer 120 formed previously may generate a chemical or physical change, such as decomposing, generating volatile matters, deforming or generating impurities, which affects the structure, composition, and electrical characteristics of the touch sensing layer 130 formed after it. For example, surface of the touch sensing layer 130 can become non-uniform, the touch sensing layer 130 can be polluted by impurities, and resistance value of the touch sensing layer 130 fluctuates easily for affecting touch sensing accuracy. Besides, the touch sensing layer 130 is formed on the cover substrate 110 and on the black insulating layer 120 simultaneously, making the touch sensing layer 130 to have a height difference H (as shown in FIG. 1), which reduces production rate.

Therefore, it is desired to provide a structure for a touch panel and a process for manufacturing the touch panel to solve the above problems.

SUMMARY OF THE DISCLOSURE

In view of the above problems, the present disclosure provides a touch panel and a manufacturing method thereof, which changes structure of a touch panel and the corresponding manufacturing process in order to solve the problem that touch sensing accuracy is affected due to resistance value of a touch sensing layer fluctuating easily and the problem that production rate is reduced due to the touch sensing layer having a height difference.

The present disclosure provides a method for manufacturing a touch panel, wherein the method comprises: forming a touch sensing layer on a visible region and a non-visible region of a cover substrate, wherein the non-visible region is located at periphery of the visible region; forming a first opaque insulating layer on the touch sensing layer in the non-visible region; forming a wiring layer on the first opaque insulating layer; and forming a conductive layer to electrically connect the wiring layer and the touch sensing layer.

The present disclosure further provides a touch panel, comprising: a cover substrate having a visible region and a non-visible region, wherein the non-visible region is located at periphery of the visible region; a touch sensing layer located on the visible region and the non-visible region of the cover substrate; a first opaque insulating layer located on the touch sensing layer in the non-visible region; a wiring layer located on the first opaque insulating layer; and a conductive layer electrically connecting the wiring layer and the touch sensing layer.

When the touch sensing layer is disposed on the cover substrate, it is not obstructed by the opaque insulating layer. Thus, the whole touch sensing layer is located at a same level of the cover substrate, having no height difference, thereby effectively improving production rate of the touch panel. Moreover, in the present disclosure, a touch sensing layer is disposed on a substrate first and then an opaque insulating layer is Ruined on the touch sensing layer on a non-visible region. Thus, the touch sensing layer is formed prior to the opaque insulating layer, and in the high-temperature process of forming the touch sensing layer, the problem of high-temperature baking the opaque insulating layer simultaneously is eliminated, thereby preventing the opaque insulating layer from generating a chemical or physical change that affects resistance value of the touch sensing layer due to a high temperature, and thus maintaining touch sensing accuracy.

BRIEF DESCRIPTION OF THE DRAWINGS

For those skilled in the art to understand the present disclosure, numerous embodiments are described below, annexing drawings to minutely illustrate the matters of the disclosure and the purpose thereof.

FIGS. 3a~3f illustrate a method for manufacturing, the touch panel shown in FIG. 2;

FIGS. 5a~5d illustrate a method for manufacturing the touch panel shown in FIG. 4.

DETAILED DESCRIPTION OF THE EMBODIMENTS

Embodiments for manufacturing and using modes of the present disclosure are described below in detail. However, it should be noted that the present disclosure provides many applicable invention concepts, which can be carried out by various specific modes. Specific embodiments illustrated in the present disclosure are only the specific modes for manufacturing and using of the present disclosure and are not used to limit the scope of the present disclosure. Besides, repeated labels or marks may be used in different embodiments. Using repeated labels or marks is only for simply and clearly describing the present disclosure and does not mean any relationship between different embodiments and/or between the structures. Moreover, if it is described that a first material layer is located on or above a second material layer, it is to be understood that the first material layer and the second material layer directly contact with each other or are spaced by one or more other material layers. In the drawings, shapes and/or thickness of the embodiments can be modified to simplify and/or facilitate marking. Furthermore, elements not shown or described in the drawings have the forms known by those skilled in the art.

An embodiment of the present disclosure provides a touch panel, wherein the touch panel comprises: a cover substrate having a visible region and a non-visible region, wherein the non-visible region is located at the periphery of the visible region; a touch sensing layer located on the visible region and the non-visible region of the cover substrate; an opaque insulating layer located on the touch sensing layer in the non-visible region; a wiring layer located on the opaque insulating layer; and a conductive layer electrically connecting the wiring layer and the touch sensing layer.

A method for manufacturing the above touch panel comprises: forming a touch sensing layer on a visible region and a non-visible region of a cover substrate, wherein the non-visible region is located at the periphery of the visible region; forming an opaque insulating layer on the touch sensing layer in the non-visible region; forming a wiring layer on the opaque insulating layer; and forming a conductive layer between the wiring layer and the touch sensing layer to electrically connect the wiring layer and the touch sensing layer.

Detailed structure and manufacturing method of the touch panel provided in the present disclosure are further described below.

Figure 2:
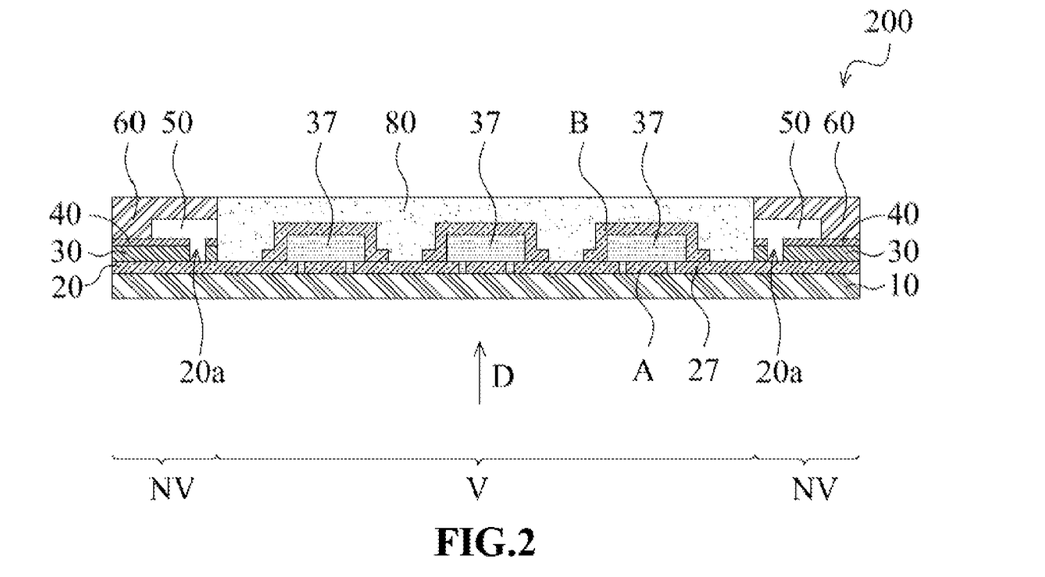
FIG. 2 is a schematic sectional view of a touch panel in accordance with an embodiment of the present disclosure.

FIG. 2 is a schematic sectional view of a touch panel 200 in accordance with an embodiment of the present disclosure. In FIG. 2, a user views and uses the touch panel 200 along a direction D. The touch panel 200 comprises a cover substrate 10 having a visible region V and a non-visible region NV, wherein the non-visible region NV is located at the periphery of the visible region V. A touch sensing layer 20 is disposed on the visible region V and the non-visible region NV of the cover substrate 10. A first opaque insulating layer 30 is disposed on the touch sensing layer 20 in the non-visible region NV. A wiring layer 40 is disposed on the first opaque insulating layer 30. By disposing the first opaque insulating layer 30, a user will not directly see the wiring layer 40 in the non-visible region NV from the direction D. The first opaque insulating layer 30 and the wiring layer 40 have a common opening 20a, wherein the common opening 20a exposes a part of the touch sensing layer 20 in the non-visible region NV. The touch panel 200 further comprises a conductive layer 50, wherein the conductive layer 50 approximately fills the common opening 20a and contacts with the wiring layer 40 and the exposed touch sensing layer 20 in the non-visible region NV, thereby electrically connecting the wiring layer 40 and the touch sensing layer 20.

The conductive layer 50 in the present embodiment can be designed as a transparent conductive layer. The touch panel 200 further comprises a second opaque insulating layer 60 located on the conductive layer 50 and covering a part of the wiring layer 40 that is not covered by the conductive layer 50, wherein color of the second opaque insulating layer 60 is the same as that of the first opaque insulating layer 30 (for example, black) such that there is no color difference generated visually between the designed conductive layer 50 and other element layers (such as the first opaque insulating layer 30) in the appearance of the touch panel 200.

The touch panel 200 further comprises a passivation layer 80, wherein the passivation layer 80 is used to cover element layers on the visible region V of the cover substrate 10, such as the touch sensing layer 20. In another embodiment, a passivation layer 80 can also extend to cover element layers on a non-visible region NV of a cover substrate 10, such as a second opaque insulating layer 60. If the second opaque insulating layer 60 located on the non-visible region NV of the cover substrate 10 is formed after the passivation layer 80, the passivation layer 80 can directly cover the wiring layer 40 and the conductive layer 50. Covered by the passivation layer 80, these element layers are protected from damage.

It would be appreciated that the touch panel 200 shown in FIG. 2 can further comprise other element layers. But for conciseness, such layers are not described herein.

Figure 3A:
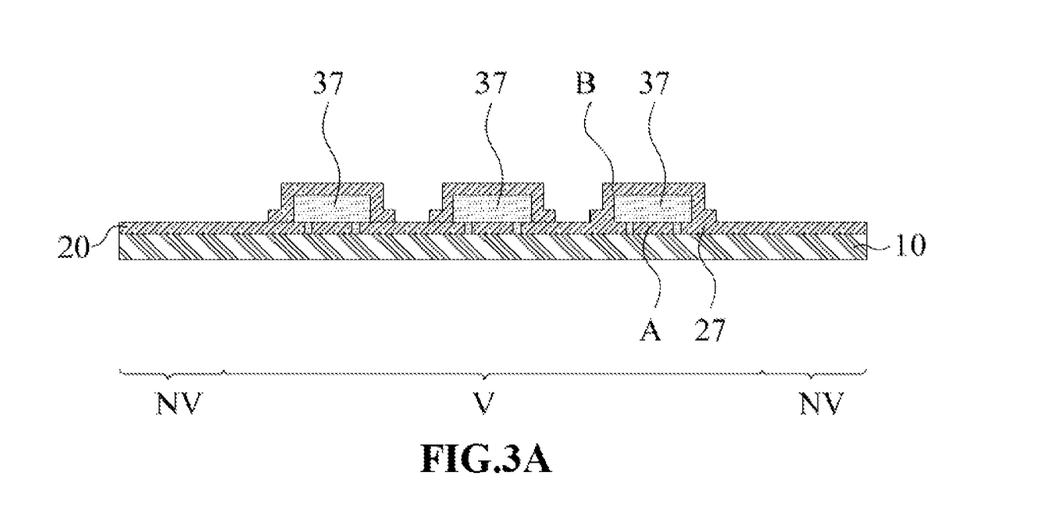

FIGS. 3a~3f illustrate a method for manufacturing the touch panel 200 shown in FIG. 2. Referring to FIG. 3a, a cover substrate 10 having a visible region V and a non-visible region NV is provided first, wherein the non-visible region NV is located at the periphery of the visible region V. Then, a touch sensing layer 20 is formed on the cover substrate 10, wherein one part of the touch sensing layer 20 is located in the visible region V and the other part is located in the non-visible region NV.

Figure 3B:
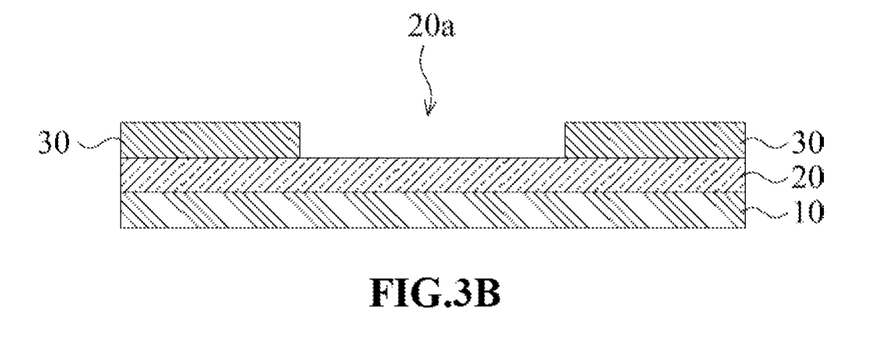

FIGS. 3b~3f illustrate partial sectional views of the non-visible region NV of the touch panel 200. Referring to FIG. 3b, after the touch sensing layer 20 is formed, a first opaque insulating layer 30 having an opening 20a is formed on the touch sensing layer 20 in the non-visible region NV wherein the opening 20a exposes a part of the touch sensing layer 20 in the non-visible region NV.

Figure 3C:
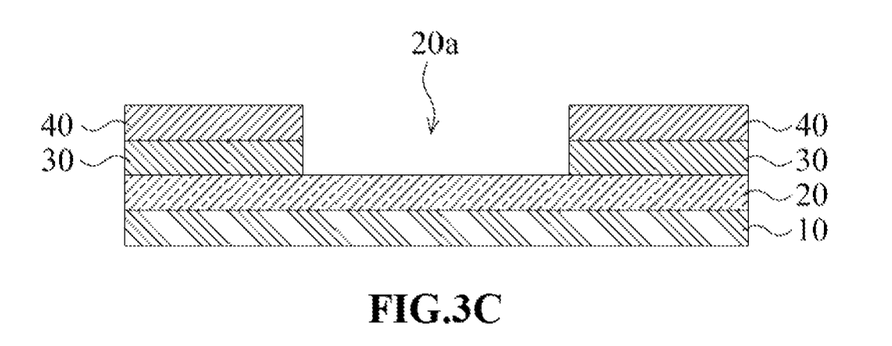

Referring to FIG. 3c, a wiring layer 40 is formed on the first opaque insulating layer 30, wherein the wiring layer 40 is also formed only in the non-visible region NV and wherein the wiring layer 40 and the first opaque insulating layer 30 have a common opening 20a to expose a part of the touch sensing layer 20 in the non-visible region NV. Side walls of the first opaque insulating layer 30 and the wiring layer 40 have been illustrated as being flush with each other, but it is not limited thereto. After the wiring layer 40 is formed, a flexible circuit board (not shown) can be connected to the wiring layer 40.

Figure 3D:
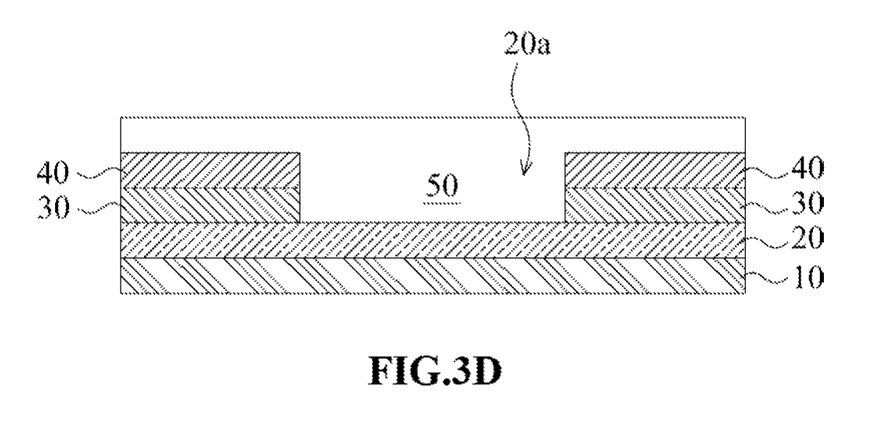

Referring to FIG. 3d, a conductive layer 50 is formed to fill the common opening 20a of the wiring layer 40 and the first opaque insulating layer 30 and to contact with the wiring layer 40 and the exposed touch sensing layer 20 in the non-visible region NV. Thus, in the present embodiment, electrical connection between the touch sensing layer 20 and the wiring layer 40 is achieved by the conductive layer 50.

Figure 3E:
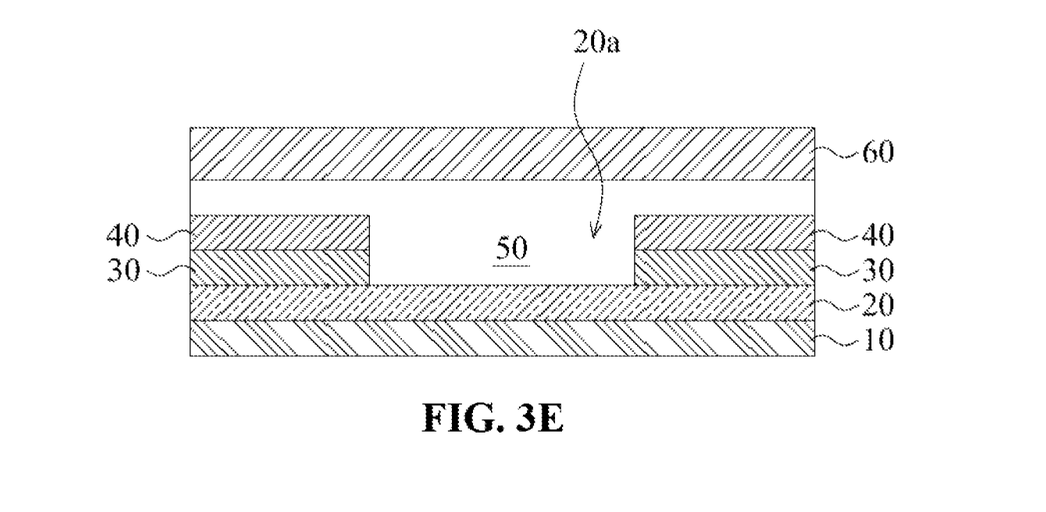

Referring to FIG. 3e, a second opaque insulating layer 60 is formed on the conductive layer 50. The second opaque insulating layer 60 and the first opaque insulating layer 30 can be made of a same material. Alternatively, color of the second opaque insulating layer 60 can be the same as that of the first opaque insulating layer 30, such as black, white, red or other colors.

In practical design, the conductive layer 50 is made of a transparent material, preferably having an optical property identical to that of the cover substrate 10 and the touch sensing layer 20, for example, using a material with a light transmittance of over 80%, a reflectivity a 10%~20%, and a refractive index of about 1.8%. Preferably, the conductive layer 50 has a high light transmittance. In some embodiments, light transmittance can reach over 80%. In some preferred embodiments, light transmittance of the conductive layer 50 can even reach over 85%. Referring to FIG. 2, when a user uses the touch panel 200 along the direction D, the user can directly see the first opaque insulating layer 30 and the second opaque insulating layer 60 formed subsequently through the cover substrate 10 and the touch sensing layer 20, because the cover substrate 10 and the touch sensing layer 20 are made of transparent materials. However, due to the conductive layer 50 being, disposed between the second opaque insulating layer 60 and the touch sensing layer 20, in the circumstance that the first opaque insulating layer 30 and the second opaque insulating layer 60 are made of a same material or in a same color, the higher the light transmittance of the conductive layer 50 is, the better the color of the second opaque insulating layer 60 is presented, thereby avoiding a color difference between the first opaque insulating layer 30 and the conductive layer 50.

Figure 3F:
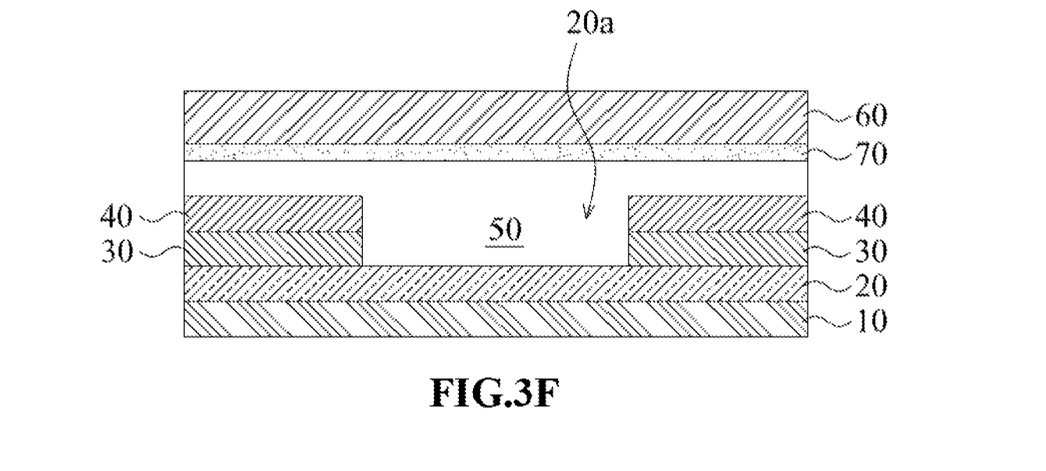

In some embodiments, referring to FIG. 3f, a passivation layer 70 can be additionally formed between the conductive layer 50 and the second opaque insulating layer 60 to protect the conductive layer 50.

Referring to FIG. 2, in the visible region V besides the touch sensing layer 20, a passivation layer 80 is further formed on the touch sensing layer 20, wherein the passivation layer 80 and the passivation layer 70 in FIG. 3f can be formed by a same material and a same manufacturing process.

In the method for manufacturing the touch panel 200 shown in FIGS. 3a~3f, the touch sensing layer 20 is formed on the cover substrate 10 first and then the first opaque insulating layer 30 is formed, and therefore the touch sensing layer 20 has no height difference, effectively improving production rate of the touch panel 200. Moreover, the problem that a black insulating layer generates a chemical or physical change, which affects the structure, composition and electrical effect of a touch sensing layer formed thereupon due to being unable to resist high temperature in conventional technology is avoided, thereby solving the problem of touch sensing accuracy being affected due to fluctuation of resistance value of the touch sensing layer 20. Meanwhile, due to the design improvement, the touch sensing layer 20 in the present embodiment has a high levelness with low pollution. Furthermore, due to high light transmittance of the conductive layer 50 and design of the second opaque insulating layer 60, the problem that the non-visible region NV easily has a color difference due to disposition of the opening 20a can be avoided. Thus, the present embodiment provides a touch panel 200 that almost has no color difference in a non-visible region NV.

Figure 4:
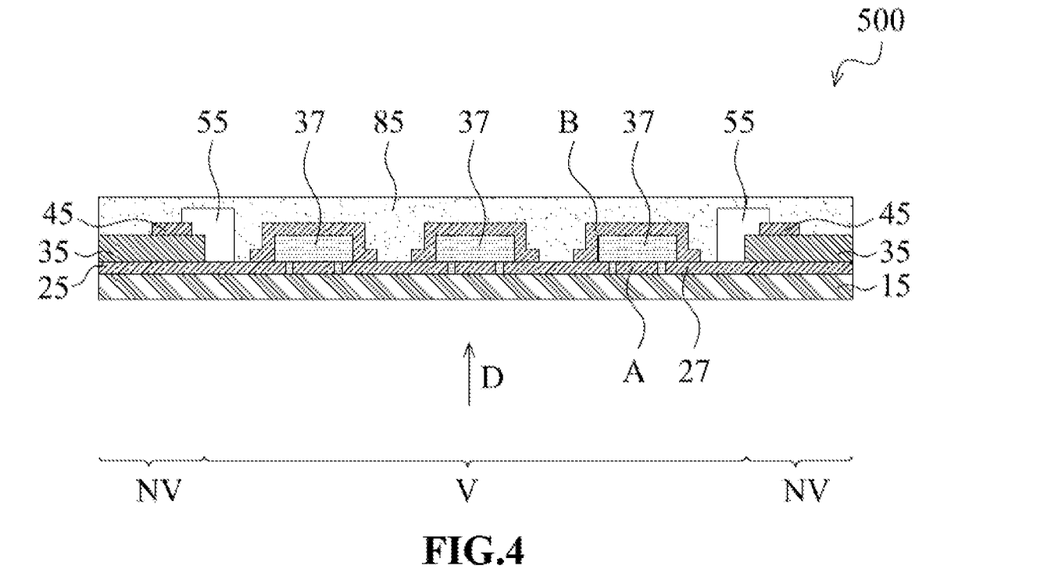
FIG. 4 is a schematic sectional view of a touch panel in accordance with another embodiment of the present disclosure.

FIG. 4 is a schematic sectional view of a touch panel 500 in accordance with another embodiment of the present disclosure. The touch panel 500 comprises a cover substrate 15 having a visible region V and a non-visible region NV wherein the non-visible region NV is located at the periphery of the visible region V. A touch sensing layer 25 is disposed on the visible region V and the non-visible region NV of the cover substrate 15. An opaque insulating layer 35 is disposed on the touch sensing layer 25 in the non-visible region NV. A wiring layer 45 is disposed on the opaque insulating layer 35. By disposition and masking of the opaque insulating layer 35, a user will not directly see the wiring layer 45 in the non-visible region NV from the direction D. A conductive layer 55 is overlaid on a part of the touch sensing layer 25 in the visible region V and on a part of the wiring layer 45 in the non-visible region NV, thereby electrically connecting the wiring layer 45 and the touch sensing layer 25, wherein the conductive layer 55 is a transparent conductive layer, which prevents itself from being presented in the visible region V.

The touch panel 500 further comprises a passivation layer 85, wherein the passivation layer 85 is used to cover all element layers on the cover substrate 15, such as the touch sensing layer 25, the opaque insulating layer 35, the wiring layer 45, and the conductive layer 55. Covered by the passivation layer 85, these element layers are protected from damage.

It should be understood that the touch panel 500 shown in FIG. 4 can further comprise other element layers. But for conciseness, it is not described herein.

Figure 5A:
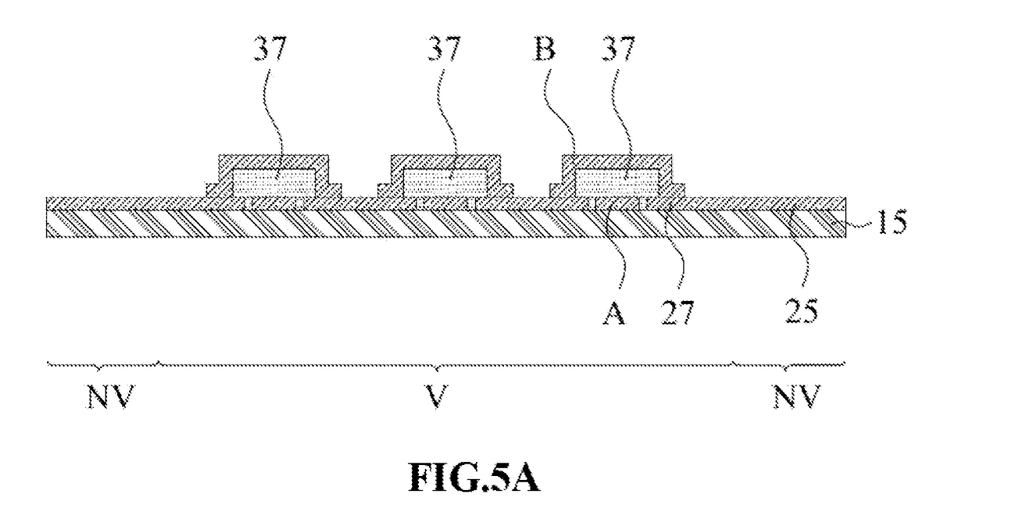

FIGS. 5a~5d illustrate a method for manufacturing the touch panel 500 shown in FIG. 4. Referring to FIG. 5a, a cover substrate 15 having a visible region V and a non-visible region NV is provided first, wherein the non-visible region NV is located at the periphery of the visible region V. Then, a touch sensing layer 25 is formed on the cover substrate 15, wherein one part of the touch sensing layer 25 is located in the visible region V and the other part is located in the non-visible region NV.

Figure 5B:
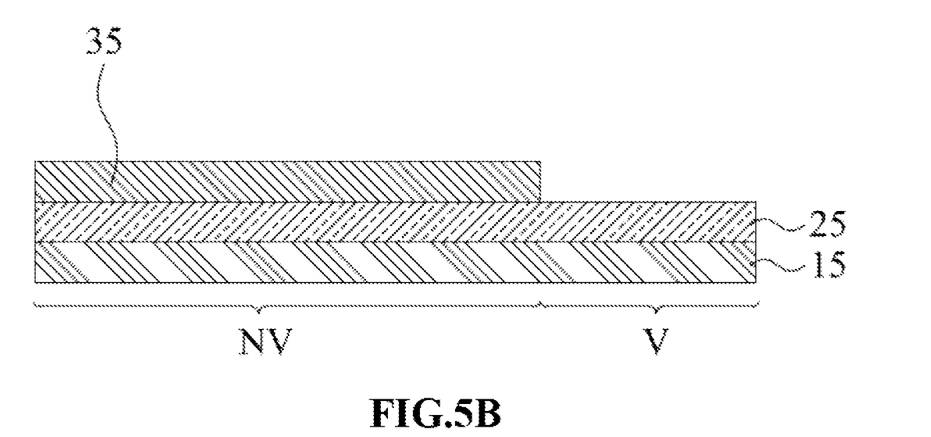
Figure 5C:
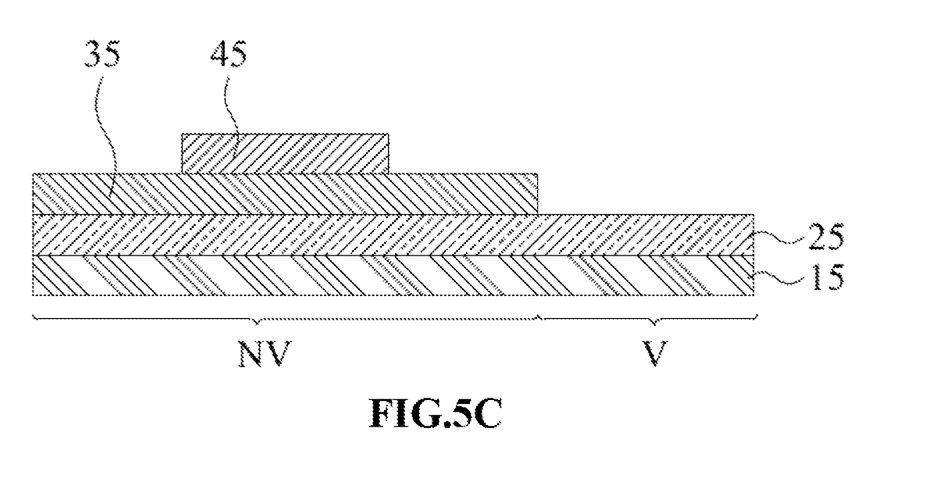
Figure 5D:
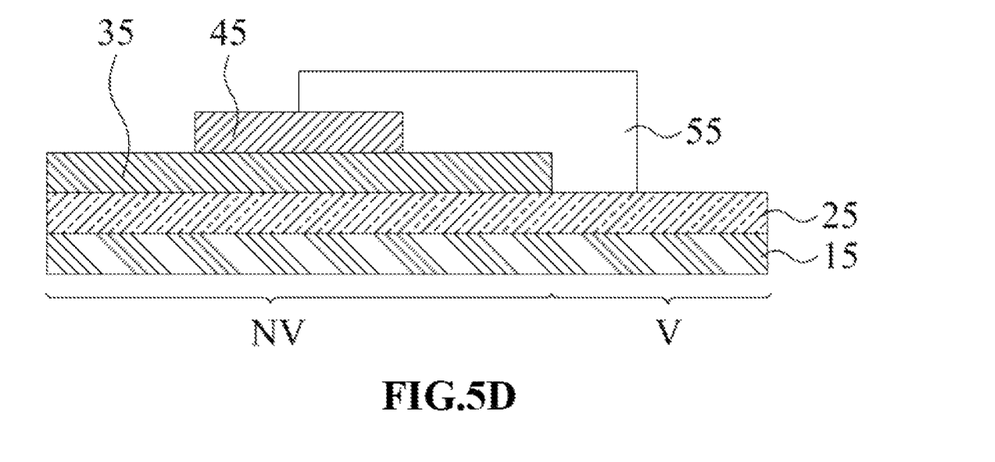

FIGS. 5b~5d illustrate partial sectional views of the visible region V and the non-visible region NV of the touch panel 500. Referring to FIG. 5b, after the touch sensing layer 25 is formed, an opaque insulating layer 35 is formed on the touch sensing layer 25 in the non-visible region NV.

Referring to FIG. 5c, a wiring layer 45 is formed on at least a part of the opaque insulating layer 35. After the wiring layer 45 is formed, a flexible circuit board (not shown) can be connected to the wiring layer 45.

Referring to FIG. 5d, a conductive layer 55 is formed in the visible region V and the non-visible region NV, wherein the conductive layer 55 in the visible region V is formed on the touch sensing layer 25 and the conductive layer 55 in the non-visible region NV is formed on at least a part of the opaque insulating layer 35 and on at least a part of the wiring layer 45. Thus, in the present embodiment, electrical connection between the touch sensing layer 25 and the wiring layer 45 is achieved by the conductive layer 55.

In practical design, the conductive layer 55 is made of a transparent material, preferably having an optical property identical with that of the cover substrate 15 and the touch sensing layer 25. Preferably, the conductive layer 55 has a high light transmittance. In some embodiments, light transmittance can reach over 80%. In some preferred embodiments, light transmittance of the conductive layer 55 can even reach over 85%.

Referring to FIG. 4 simultaneously, in the visible region V besides the touch sensing layer 25, a passivation layer 85 is further formed to cover the touch sensing layer 25 and other element layers, wherein the passivation layer 85 can further extend to cover the opaque insulating layer 35, the wiring layer 45 and the conductive layer 55 in the non-visible region NV. Covered by the passivation layer 85, these element layers are protected from damage.

In the method for manufacturing the touch panel 500 shown in FIGS. 5a~5d, the touch sensing layer 25 is formed on the cover substrate 15 first and then the opaque insulating layer 35 is formed; thus, the touch sensing layer 25 has no height difference, thereby effectively improving production rate of the touch panel 500. Moreover, the problem that the structure, composition and electrical characteristics of a touch sensing layer are affected by a black insulating layer in conventional technology is avoided, thereby solving the problem of touch sensing accuracy being affected due to fluctuation of resistance value of the touch sensing layer. Meanwhile, due to the design improvement, the touch sensing layer 25 in the present embodiment has a high levelness with low pollution. Furthermore, due to high light transmittance of the conductive layer 55, the conductive layer 55 can not only be used in the non-visible region NV but can also extend to the visible region V thereby providing many different application possibilities. Thus, the present embodiment provides a touch panel 500, wherein a conductive layer 55 can not only be applied in a non-visible region NV but can also be applied in a visible region V.

In the above embodiments, the cover substrate 10 and the cover substrate 15 can be organic substrates or inorganic substrates, wherein the organic substrates can be made of plasticized materials and the inorganic substrates can be made of glass materials. The cover substrate in the above embodiments can be used as a protection cover for internal element layers of a touch panel and as a supporting substrate for a touch sensing layer simultaneously.

Figure 6:
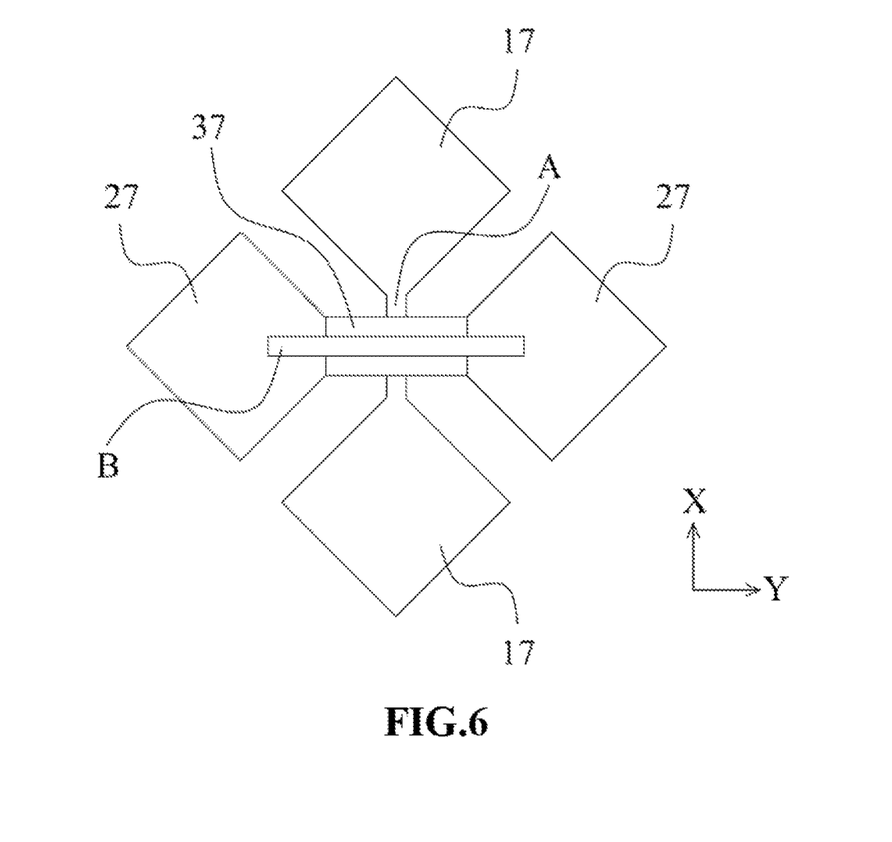
FIG. 6 is a schematic top view of an enlarged part of a touch sensing layer.

In the above embodiments, with regard to the structures of the touch sensing layer 20 and the touch sensing layer 25, besides the sectional structures respectively shown in FIG. 2 and FIG. 4, a schematic top view of an enlarged part of a touch sensing layer shown in FIG. 6 can be further referenced. As shown in FIG. 6, the touch sensing layer comprises a plurality of first electrodes 17 arranged along a first direction X and a plurality of second electrodes 27 arranged along a second direction Y, wherein the first direction X can be perpendicular to the second direction Y.

The touch sensing layer further comprises connection units A, connection units B, and insulating layers 37, wherein the connection units A are used to electrically connect the two adjacent first electrodes 17 along the first direction X respectively, and wherein the connection units B are used to electrically connect the two adjacent second electrodes 27 along the second direction Y respectively. Besides, the connection units B are interlaced with the connection units A, and in the present embodiment, the connection units B are disposed above the connection units A. Moreover, the insulating layers 37 are disposed between the connection units A and the connection units B to separate the connection units A from the connection units B such that the first electrodes 17 are electrically insulated from the second electrodes 27. Thus, the connection units B located above the connection units A can be bridging structures. It should be understood that although the first electrodes 17 and the second electrodes 27 in FIG. 6 are designed in a shape of rhombus, the shape can further include triangle, rectangle, hexagon, octagon or other proper shapes.

Thus, electrode arrays formed in the touch sensing layer are used to generate a sensing signal. The above-mentioned conductive layer transmits the sensing signal to the wiring layer, and then the wiring layer transmits the sensing signal to the flexible circuit board. Finally, the sensing signal is transmitted to a back-end processor (not shown) for calculation of the actual touch location.

In addition, materials of the first electrodes 17, the second electrodes 27 and the connection units A can include indium tin oxide (ITO), indium zinc oxide (IZO), cadmium tin oxide (CTO), aluminum zinc oxide (AZO), indium tin zinc oxide (ITZO), zinc oxide (ZnO), cadmium oxide (CdO), hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO), or any of the above combinations. In some embodiments, material of connection units B can be the same as material of second electrodes 27. In other embodiments, material of connection units B can be the same as material of a wiring layer, and the connection units B can be formed together with the wiring layer. The above insulating layers 37 can be made of epoxy resin, polyimide or polymethyl methacrylate.

The process of forming a touch sensing layer is further illustrated below. In practical design, a touch sensing layer can be formed by any conventional process. For example, in an embodiment, formation of a touch sensing layer comprises the steps of: sputtering a transparent electrode layer made of ITO, IZO or AZO on a cover substrate; depositing photoresist to perform photolithography, etching the transparent electrode layer to form a plurality of first electrodes 17 arranged along a first direction X, form connection units A, and form a plurality of second electrodes 27 arranged along a second direction Y in the touch sensing layer; forming patterned insulating layers 37 on the connection units A; and forming connection units B. Thus, the insulating layers 37 are located between the connection units A and the connection units B such that the first electrodes 17 are electrically insulated from the second electrodes 27.

In the above embodiments, the first opaque insulating layer 30, the second opaque insulating layer 60, and the opaque insulating layer 35 can be printing ink layers (such as black priming ink, red printing ink or printing ink of other colors according to the design requirement) and formed by a printing process. In other embodiments, a first opaque insulating layer 30, a second opaque insulating layer 60, and an opaque insulating layer 35 can be photoresist layers (such as black photoresist, red photoresist or photoresist of other colors according to the design requirement) and formed by a depositing and photolithographic process.

In the above embodiments, the wiring layer 40 or 45 can be patterned by depositing, photolithography and etching, wherein the depositing mode is physical vapor deposition (PVD) or chemical vapor deposition (CVD), wherein the PVD can include evaporation or sputtering and the CVD can include low pressure chemical vapor deposition (LPCVD), metal-organic chemical vapor deposition (MOCVD), plasma-enhanced chemical vapor deposition (PECVD) or photo chemical vapor deposition (PHOTO CVD). Material of the wiring layer 40 or 45 can include gold, silver, copper, nickel, aluminum, chromium or any of the above combinations.

In the above embodiments, the conductive layer 50 or 55 preferably has a high adhesiveness to the touch sensing layer 20 or 25. In some embodiments that carry out an adhesion test to determine adhesive force of a conductive layer 50 or 55 to a touch sensing layer 20 or 25, the adhesive force can reach over 3B. Besides, the conductive layer 50 or 55 is preferably resistant to high temperature, such as 100~180° C. Moreover, the conductive layer 50 or 55 is preferably highly resistant to acid and alkali.

In the above embodiments, the conductive layer 50 or 55 can be a transparent conductive polymer layer formed by printing an aqueous dispersion, wherein material of the aqueous dispersion can include poly(3,4-ethylenedioxythiophene), poly(stenesulfonate), any of the above combinations, or other proper materials. The aqueous dispersion can further include organic solvent and/or polymer adhesive. Alternatively, in other embodiments, material of a conductive layer 50 or 55 can be the same as the material of the above-mentioned electrodes. In some embodiments, an aqueous dispersion is printed on a cover substrate first and then baked to form a transparent conductive layer. In some embodiments, baking condition can be baking for 30 minutes under the temperature of 80° C.

In the above embodiments, material of the passivation layer 70, 80 or 85 can include polysiloxane, silicone, acryl polymer, or any of the above combinations.

In the above embodiments, the adopted touch panel can be a capacitive touch panel preferably.

While certain embodiments have been shown and described, various modifications and substitutions may be made thereto without departing from the spirit and scope of the present disclosure. Therefore, it is to be understood that the present disclosure has been described by way of illustration and not limitations.

What is claimed is:

1. A method for manufacturing a touch panel, comprising: forming a touch sensing layer on a visible region and a non-visible region of a cover substrate, wherein the non-visible region is located at periphery of the visible region; forming a first opaque insulating layer on the touch sensing layer in the non-visible region; forming a wiring layer on the first opaque insulating layer; and forming a conductive layer to electrically connect the wiring layer and the touch sensing layer; and wherein the step of forming the wiring layer on the first opaque insulating layer further comprises: forming a common opening in the wiring layer and the first opaque insulating layer, wherein the common opening exposes a part of the touch sensing layer in the non-visible region.

2. The method for manufacturing the touch panel as claimed in claim 1, wherein the step of forming the conductive layer further comprises: filling the conductive layer into the common opening to electrically connect the wiring layer and the exposed touch sensing layer in the non-visible region.

3. The method for manufacturing the touch panel as claimed in claim 1, wherein the conductive layer is a transparent conductive layer, and wherein the method further comprises forming a second opaque insulating layer on the conductive layer.

4. The method for manufacturing the touch panel as claimed in claim 1, wherein the step of forming the conductive layer further comprises: forming the conductive layer on a part of the touch sensing layer in the visible region and on a part of the wiring layer in the non-visible region, wherein the conductive layer is a transparent conductive layer.

5. The method for manufacturing the touch panel as claimed in claim 1, further comprising: forming a passivation layer to cover element layers formed on the cover substrate.

6. The method for manufacturing the touch panel as claimed in claim 1, wherein the touch sensing layer comprises a plurality of first electrodes arranged along a first direction and a plurality of second electrodes arranged along a second direction.

7. The method for manufacturing the touch panel as claimed in claim 6, wherein the touch sensing layer further comprises a plurality of first connection units, a plurality of second connection units, and a plurality of insulating layers, wherein the first connection units electrically connect two adjacent first electrodes along the first direction respectively, and wherein the second connection units electrically connect two adjacent second electrodes along the second direction respectively, Wherein the first connection units are interlaced with the second connection units, and wherein the insulating layers are disposed correspondingly between the first connection units and the second connection units such that the first electrodes are electrically insulated from the second electrodes.

8. The method for manufacturing the touch panel as claimed in claim 1, wherein the conductive layer is a transparent conductive polymer layer formed by printing an aqueous dispersion, and wherein light transmittance of the conductive layer is over 80%.

9. The method for manufacturing the touch panel as claimed in claim 8, wherein material of the aqueous dispersion comprises of poly(3,4-ethylenedioxythiophene), poly(styrenesulfonate), or a combination thereof.

10. A touch panel, comprising: a cover substrate having a visible region and a non-visible region, wherein the non-visible region is located at periphery of the visible region; a touch sensing layer located on the visible region and the non-visible region of the cover substrate; a first opaque insulating layer located on the touch sensing layer in the non-visible region; a wiring layer located on the first opaque insulating layer; and a conductive layer electrically connecting the wiring layer and the touch sensing layer; and wherein the wiring layer and the first opaque insulating, layer have a common opening, and wherein the common opening exposes a part of the touch sensing layer in the non-visible region.

11. The touch panel as claimed in claim 10, wherein the conductive layer is further filled into the common opening to electrically connect the wiring layer and the exposed touch sensing layer in the non-visible region.

12. The touch panel as claimed in claim 10, wherein the conductive layer is a transparent conductive layer, and wherein the touch panel further comprises a second opaque insulating layer located on the conductive layer.

13. The touch panel as claimed in claim 10, wherein the conductive layer is further formed on a part of the touch sensing layer in the visible region and on a part of the wiring layer in the non-visible region to electrically connect the wiring layer and the touch sensing layer, wherein the conductive layer is a transparent conductive layer.

14. The touch panel as claimed in claim 10, further comprising a passivation layer covering element layers formed on the cover substrate.

15. The touch panel as claimed in claim 10, wherein the touch sensing layer comprises a plurality of first electrodes arranged along a first direction and a plurality of second electrodes arranged along a second direction.

16. The touch panel as claimed in claim 15, wherein the touch sensing layer further comprises a plurality of first connection units, a plurality of second connection units, and a plurality of insulating layers, wherein the first connection units electrically connect two adjacent first electrodes along the first direction respectively, and wherein the second connection units electrically connect two adjacent second electrodes along the second direction respectively, wherein the first connection units are interlaced with the second connection units, and wherein the insulating layers are disposed correspondingly between the first connection units and the second connection units such that the first electrodes are electrically insulated from the second electrodes.

17. The touch panel as claimed in claim 10, wherein the conductive layer is a transparent conductive polymer layer formed by printing an aqueous dispersion, and wherein light transmittance of the conductive layer is over 80%.

18. The touch panel as claimed in claim 17, wherein material of the aqueous dispersion comprises of poly(3,4-ethylenedioxythiophene), poly(styrenesulfonate), or a combination thereof.

* * * * *